US012546155B2

(12) United States Patent
Lee

(10) Patent No.: US 12,546,155 B2
(45) Date of Patent: Feb. 10, 2026

(54) DOOR DESCENT PREVENTING APPARATUS

(71) Applicant: LG Energy Solution, Ltd., Seoul (KR)

(72) Inventor: Jung Soo Lee, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 209 days.

(21) Appl. No.: 18/288,705

(22) PCT Filed: Mar. 27, 2023

(86) PCT No.: PCT/KR2023/004013
§ 371 (c)(1),
(2) Date: Oct. 27, 2023

(87) PCT Pub. No.: WO2023/191411
PCT Pub. Date: Oct. 5, 2023

(65) Prior Publication Data

US 2024/0200376 A1 Jun. 20, 2024

(30) Foreign Application Priority Data

Apr. 1, 2022 (KR) ........................ 10-2022-0041106

(51) Int. Cl.
*E04H 12/00* (2006.01)
*E05C 17/60* (2006.01)
(Continued)

(52) U.S. Cl.
CPC ............ *E05D 13/003* (2013.01); *E05C 17/60* (2013.01); *E05F 5/003* (2013.01); *F16P 1/00* (2013.01);
(Continued)

(58) Field of Classification Search
CPC ....... E05D 13/003; E05D 15/16; E05C 17/60; E05C 17/54; F16P 1/00; E05Y 2201/706; F26B 25/12; E06B 9/84
See application file for complete search history.

(56) References Cited

U.S. PATENT DOCUMENTS 973,670 A * 10/1910 Kinnear .................. E02D 27/42 52/223.5
1,494,778 A * 5/1924 Enders .................... B60B 33/06 5/611
(Continued)

FOREIGN PATENT DOCUMENTS

JP 2003166376 A 6/2003
JP 2005232693 A 9/2005
(Continued)

OTHER PUBLICATIONS

International Search Report for PCT/KR2023/004013 mailed Jun. 27, 2023. 3 pages.

*Primary Examiner* — Basil S Katcheves
(74) *Attorney, Agent, or Firm* — Lerner David LLP

(57) ABSTRACT

The present invention relates to a door descent preventing apparatus, and more particularly a door descent preventing apparatus mounted to a shaft installed at an inlet or an outlet of a chamber in a vertical direction in order to prevent descent of a door configured to be moved upwards and downwards along the shaft, the door descent preventing apparatus including a plurality of support bars, an upper fixing unit configured to connect upper ends of the support bars to each other, the upper fixing unit including a first upper fixing piece having a semicircular arc shape and a second upper fixing piece having a semicircular arc shape, and a lower fixing unit configured to connect lower ends of the support bars to each other, the lower fixing unit including a first lower fixing piece having a semicircular arc shape and a second lower fixing piece having a semicircular arc shape.

9 Claims, 4 Drawing Sheets

(51) Int. Cl.

| | |
|---|---|
| ***E05D 13/00*** | (2006.01) |
| ***E05F 5/00*** | (2017.01) |
| ***F16P 1/00*** | (2006.01) |
| *F26B 25/12* | (2006.01) |

(52) U.S. Cl.

CPC ......... *E05Y 2201/706* (2013.01); *F26B 25/12* (2013.01)

(56) References Cited

U.S. PATENT DOCUMENTS

| | | | | |
|---|---|---|---|---|
| 1,545,456 | A * | 7/1925 | Rastetter | E04H 12/08 52/301 |
| 2,646,956 | A * | 7/1953 | Cadwell | F16M 11/245 403/104 |
| 3,501,920 | A * | 3/1970 | Minoru | B28B 21/56 52/223.4 |
| 4,203,707 | A * | 5/1980 | Stepp | F03D 3/067 416/41 |
| 5,137,236 | A * | 8/1992 | Burns | F16M 11/046 248/169 |
| 5,505,524 | A * | 4/1996 | Drumwright | A47C 7/004 297/183.5 |
| 6,244,014 | B1 * | 6/2001 | Barmakian | B29C 45/14549 52/834 |
| D641,611 | S * | 7/2011 | Minayoshi | D8/354 |
| 9,470,354 | B2 * | 10/2016 | Boyanich | F16L 3/13 |
| 9,937,643 | B2 * | 4/2018 | Goss | B29C 39/10 |
| D876,928 | S * | 3/2020 | Cramer | D8/354 |
| 11,060,314 | B2 * | 7/2021 | Suyama | E04H 12/10 |
| 2004/0020158 | A1 * | 2/2004 | Kopshever, Sr. | H01Q 1/1242 52/835 |
| 2004/0139665 | A1 * | 7/2004 | Ullrich | E04H 12/085 52/169.9 |
| 2019/0112850 | A1 * | 4/2019 | D'Souza | E05C 17/54 |
| 2020/0038070 | A1 * | 2/2020 | Suddaby | A61F 2/4405 |
| 2020/0087972 | A1 * | 3/2020 | Ueda | E05F 15/652 |
| 2020/0308863 | A1 * | 10/2020 | Suyama | E04H 12/10 |
| 2022/0316224 | A1 * | 10/2022 | Fore, III | E04C 5/16 |
| 2023/0011074 | A1 * | 1/2023 | Sugden | E02D 27/00 |
| 2023/0032875 | A1 * | 2/2023 | Ustach | E01F 9/617 |
| 2023/0235606 | A1 * | 7/2023 | Bruss | E05F 5/00 49/126 |

FOREIGN PATENT DOCUMENTS

| | | | |
|---|---|---|---|
| JP | 2011111798 | A | 6/2011 |
| KR | 20000001507 | A | 1/2000 |
| KR | 100593063 | B1 | 6/2006 |
| KR | 100834028 | B1 | 6/2008 |
| KR | 100895019 | B1 | 4/2009 |
| KR | 200445242 | Y1 | 7/2009 |
| KR | 20120042122 | A | 5/2012 |
| KR | 20200000780 | A | 1/2020 |
| KR | 20210007601 | A | 1/2021 |

* cited by examiner

【FIG. 1】
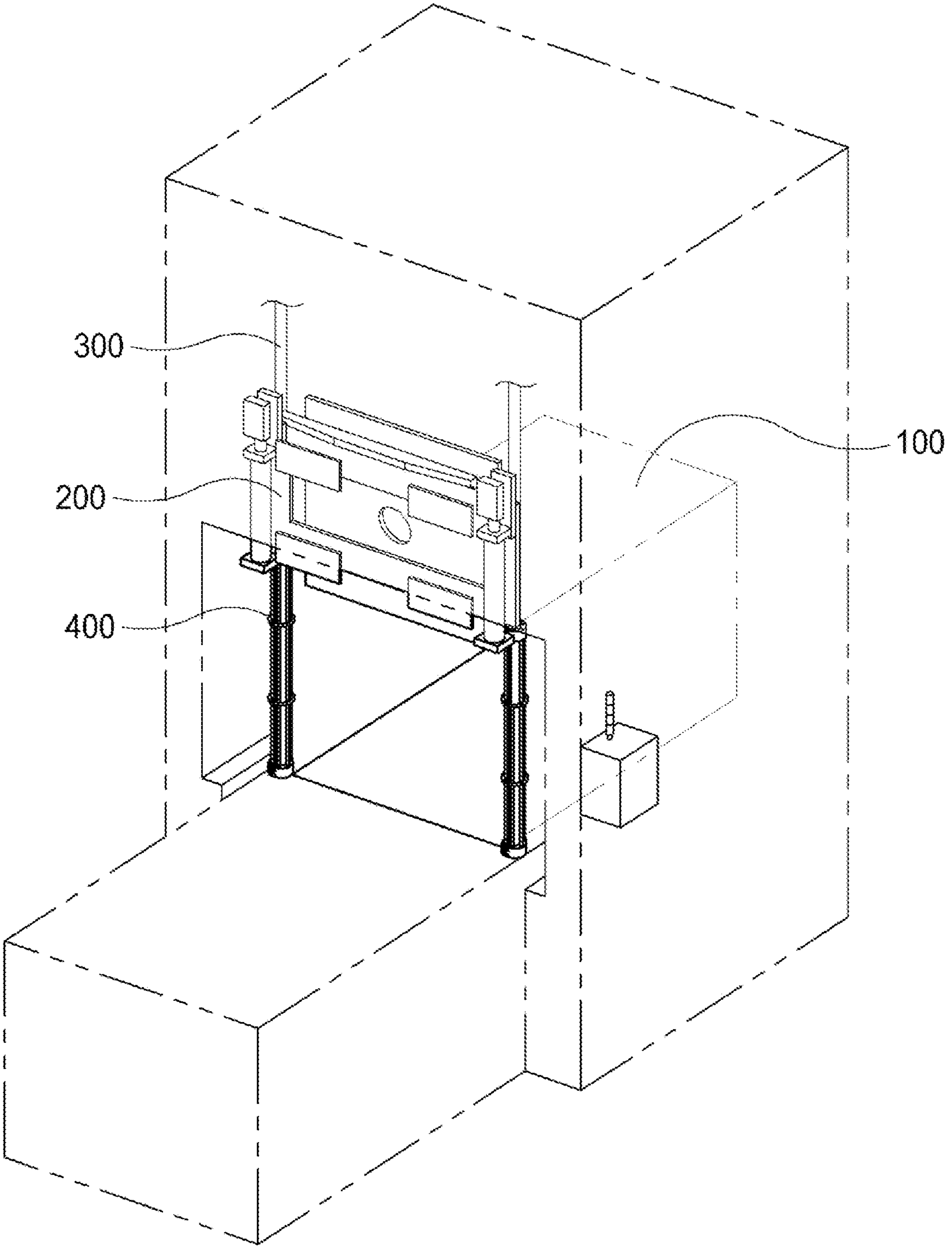

【FIG. 2】
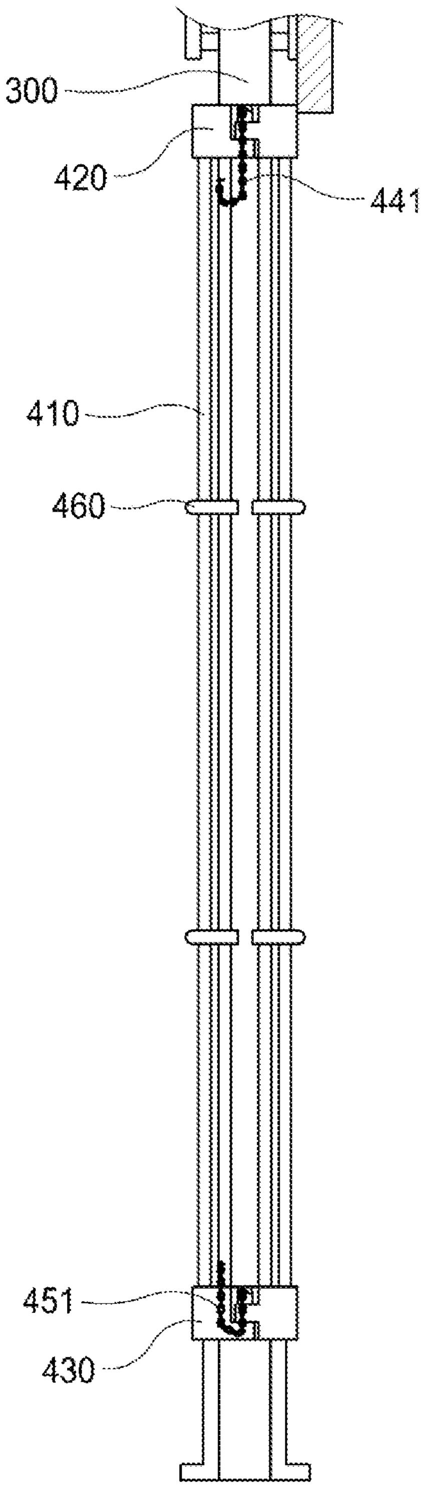

【FIG. 3】
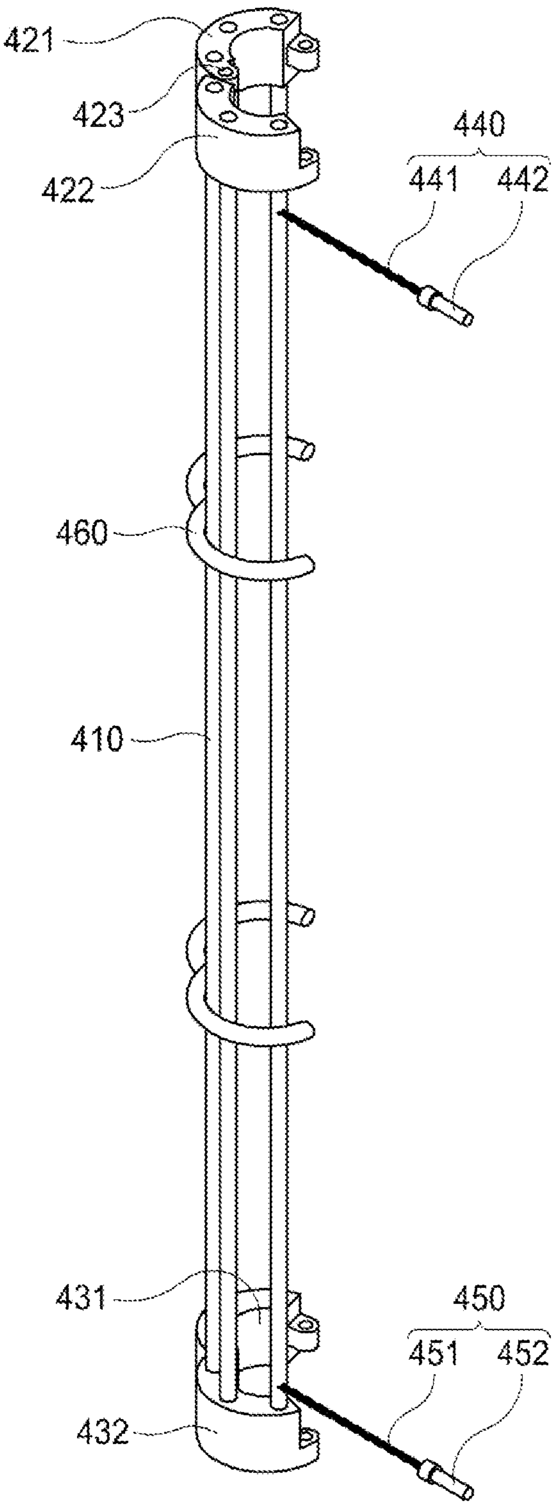

【FIG. 4】
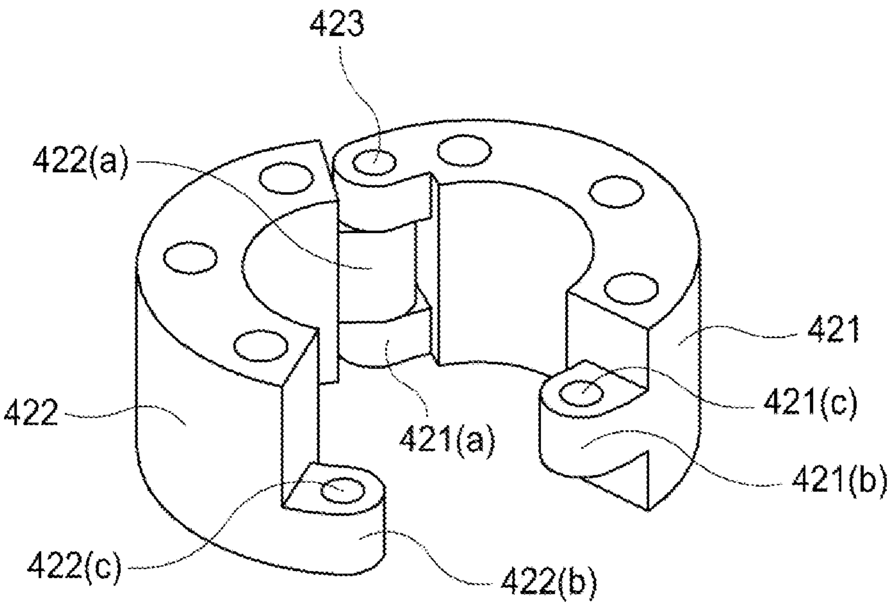
(a)
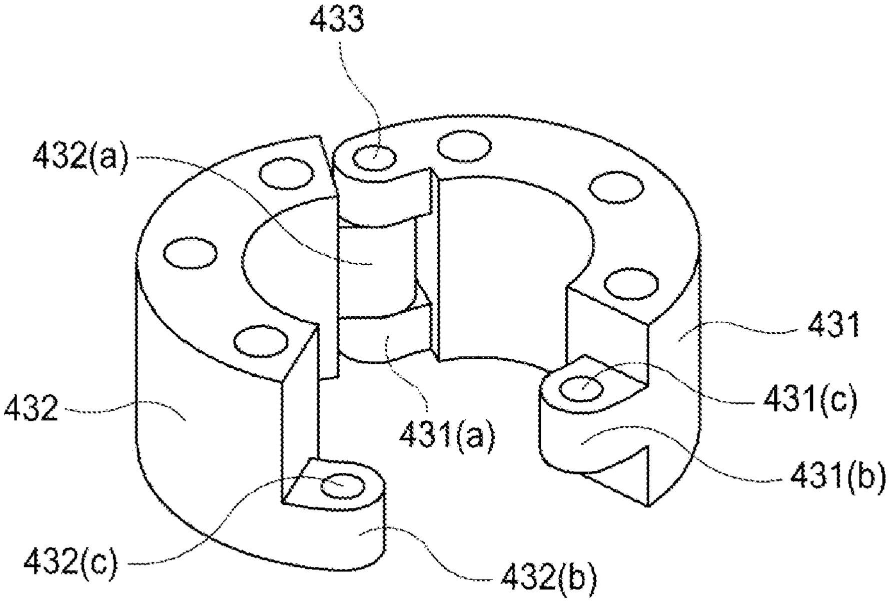
(b)

DOOR DESCENT PREVENTING APPARATUS

CROSS-REFERENCE TO RELATED APPLICATIONS

This application is a national phase entry under 35 U.S.C. § 371 of International Application No. PCT/KR2023/004013, filed Mar. 27, 2023, which claims the benefit of priority to Korean Patent Application No. 10-2022-0041106 filed on Apr. 1, 2022, the disclosure of which is incorporated herein by reference in its entirety.

TECHNICAL FIELD

The present invention relates to a door descent preventing apparatus, and more particularly to a door descent preventing apparatus capable of preventing occurrence of an accident due to abrupt descent of a heavy door configured to hermetically seal a chamber.

BACKGROUND ART

With recent development of alternative energies due to air pollution and energy depletion caused as the result of use of fossil fuels, demand for secondary batteries capable of storing electrical energy that is produced has increased. The secondary batteries, which are capable of being charged and discharged, are intimately used in daily life. For example, the secondary batteries are used in mobile devices, electric vehicles, and hybrid electric vehicles.

Required capacities of secondary batteries used as energy sources of various kinds of electronic devices inevitably used in modern society have been increased due to an increase in usage of mobile devices, increasing complexity of the mobile devices, and development of electric vehicles. In order to satisfy demand of users, a plurality of battery cells is disposed in a small-sized device, whereas a battery module including a plurality of battery cells electrically connected to each other or a battery pack including a plurality of battery modules is used in a vehicle.

When the battery is manufactured, a process of introducing an electrode into a chamber and performing vacuum drying is generally performed.

That is, after the electrode is introduced into the chamber, a heavy door configured to be movable along a shaft is moved downwards to hermetically seal the chamber under control based on an electrical signal.

When the electrode is introduced into the chamber or various kinds of devices are inspected, however, the door may be closed for unexpected reasons, whereby a worker may be confined in the chamber or may be pressed by the door, which may lead to a major accident.

PRIOR ART DOCUMENT (Patent Document 1) Korean Patent Application Publication No. 2020-0000780

Technical Problem

The present invention has been made in view of the above problems, and it is an object of the present invention to provide a door descent preventing apparatus capable of preventing physical injury of a worker caused by descent of a door of a chamber, etc. due to malfunction thereof.

Technical Solution

In order to accomplish the above object, a door descent preventing apparatus according to the present invention includes a door descent preventing apparatus mounted to an outer circumferential surface of a shaft (300) installed at an inlet or an outlet of a chamber (100) in a vertical direction in order to prevent descent of a door (200) configured to be moved upwards and downwards along the shaft (300), the door descent preventing apparatus including a plurality of support bars (410), an upper fixing unit (420) configured to connect upper ends of the support bars (410) to each other, the upper fixing unit being constituted by a first upper fixing piece (421) having a semicircular arc shape and a second upper fixing piece (422) having a semicircular arc shape, and a lower fixing unit (430) configured to connect lower ends of the support bars (410) to each other, the lower fixing unit being constituted by a first lower fixing piece (431) having a semicircular arc shape and a second lower fixing piece (432) having a semicircular arc shape.

Also, in the door descent preventing apparatus according to the present invention, the first upper fixing piece (421) and the second upper fixing piece (422) of the upper fixing unit (420) may be connected to each other via a first turning shaft (423) so as to be turnable in the state in which the first upper fixing piece and the second upper fixing piece are fastened to each other.

Also, in the door descent preventing apparatus according to the present invention, the first upper fixing piece (421) may be provided with a second protrusion (421(*b*)) having a first through-hole (421(*c*)), the second upper fixing piece (422) may be provided with a fourth protrusion (422(*b*)) having a second through-hole (422(*c*)), and the first through-hole (421(*c*)) and the second through-hole (422(*c*)) may be aligned or located on the same vertical line when the second protrusion (421(*b*)) and the fourth protrusion (422(*b*)) overlap each other.

In addition, the door descent preventing apparatus according to the present invention may further include an upper locking loop (440) mounted in the first through-hole (421(*c*)) and the second through-hole (422(*c*)).

Also, in the door descent preventing apparatus according to the present invention, the upper locking loop (440) may include a first connection portion (441) having one side connected to the support bar (410) and a first pin (442) having one side connected to the first connection portion (441), the first pin being detachably coupled to the first through-hole (421(*c*)) and the second through-hole (422(*c*)).

Also, in the door descent preventing apparatus according to the present invention, the first lower fixing piece (431) and the second lower fixing piece (432) of the lower fixing unit (430) may be connected to each other via a second turning shaft (433) so as to be turnable in the state in which the first lower fixing piece and the second lower fixing piece are fastened to each other.

Also, in the door descent preventing apparatus according to the present invention, the first lower fixing piece (431) may be provided with a sixth protrusion (431(*b*)) having a third through-hole (431(*c*)), the second lower fixing piece (432) may be provided with an eighth protrusion (432(*b*)) having a fourth through-hole (432(*c*)), and the third through-hole (431(*c*)) and the fourth through-hole (432(*c*)) may be aligned or located on the same vertical line when the sixth protrusion (431(*b*)) and the eighth protrusion (432(*b*)) overlap each other.

In addition, the door descent preventing apparatus according to the present invention may further include a lower locking loop (450) mounted in the third through-hole (431(*c*)) and the fourth through-hole (432(*c*)).

Also, in the door descent preventing apparatus according to the present invention, the lower locking loop (450) may include a second connection portion (451) having one side connected to the support bar (410) and a second pin (452) having one side connected to the second connection portion (451), the second pin being detachably coupled to the third through-hole (431(*c*)) and the fourth through-hole (432(*c*)).

In addition, the door descent preventing apparatus according to the present invention may further include at least one auxiliary fixing portion (460) configured to connect the plurality of support bars (410) to each other.

Advantageous Effects

As is apparent from the above description, a door descent preventing apparatus according to the present invention mounted to an outer circumferential surface of a shaft has an advantage in that, even though a door descends due to malfunction thereof, it is possible to prevent descent of the door by the provision of the door descent preventing apparatus, whereby it is possible to prevent a worker from being confined in a chamber or the worker from being pressed and harmed by the door.

In addition, the door descent preventing apparatus according to the present invention has a merit in that an upper fixing unit and a lower fixing unit are turnable, whereby the upper fixing unit and the lower fixing unit are easily mounted to or separated from the shaft, and therefore it is possible to minimize time necessary for installation and withdrawal.

DESCRIPTION OF DRAWINGS

FIG. 1 is a conceptual view showing the state in which a door descent preventing apparatus according to a preferred embodiment of the present invention is provided at a chamber.

FIG. 2 is an enlarged view showing the state in which the door descent preventing apparatus according to the preferred embodiment of the present invention is mounted to a shaft.

FIG. 3 is a perspective view of the door descent preventing apparatus according to the preferred embodiment of the present invention.

FIG. 4 is an enlarged view of an upper fixing unit and a lower fixing unit in the door descent preventing apparatus according to the preferred embodiment of the present invention.

BEST MODE

Now, preferred embodiments of the present invention will be described in detail with reference to the accompanying drawings such that the preferred embodiments of the present invention can be easily implemented by a person having ordinary skill in the art to which the present invention pertains. In describing the principle of operation of the preferred embodiments of the present invention in detail, however, a detailed description of known functions and configurations incorporated herein will be omitted when the same may obscure the subject matter of the present invention.

In addition, the same reference numbers will be used throughout the drawings to refer to parts that perform similar functions or operations. In the case in which one part is said to be connected to another part throughout the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a door descent preventing apparatus according to the present invention will be described with reference to the accompanying drawings.

FIG. 1 is a conceptual view showing the state in which a door descent preventing apparatus according to a preferred embodiment of the present invention is provided at a chamber.

Referring to FIG. 1, the chamber 100 is provided with a receiving space having a predetermined size configured to receive an electrode, etc., and one surface or each of opposite surfaces of the chamber is open so as to be closed by a door 200. Although the chamber 100 is shown as having a hexahedral shape in the figure, this is merely an example, and the shape of the chamber may be easily changed.

The chamber 100 may be made of a metal material, and the material for the chamber is not particularly restricted as long as it is possible to block pressure generated by vacuum and to isolate the inside and the outside of the chamber from each other.

The door 200 is located at the open surface of the chamber 100, and is mounted so as to be movable upwards and downwards along a shaft 300. The door 200 may be manually opened and closed by a worker or may be automatically opened and closed by a driving motor (not shown) according to a signal transmitted to the driving motor.

The shaft 300 serves to guide the door 200 such that the door is movable upwards and downwards, and it is preferable for at least two shafts to be installed at the edge of the open surface of the chamber 100 in a vertical direction.

A fastening structure between the door 200 and the shaft 300 is not particularly restricted as long as the door 200 is movable upwards and downwards along the shaft 300.

The door descent preventing apparatus 400 is detachably mounted to the shaft 300 and is configured to prevent malfunction of the door 200, such as unintentional closing of the door. The door descent preventing apparatus will be described below in more detail.

FIG. 2 is an enlarged view showing the state in which the door descent preventing apparatus according to the preferred embodiment of the present invention is mounted to the shaft, FIG. 3 is a perspective view of the door descent preventing apparatus according to the preferred embodiment of the present invention, and FIG. 4 is an enlarged view of an upper fixing unit and a lower fixing unit in the door descent preventing apparatus according to the preferred embodiment of the present invention.

Referring to FIGS. 2 to 4, the door descent preventing apparatus 400 according to the preferred embodiment of the present invention is configured to prevent descent of the door 200 movable upwards and downwards along the shaft 300, as described above, and is detachably mounted to an outer circumferential surface of the shaft 300. The door descent preventing apparatus 400 includes a support bar 410, an upper fixing unit 420, a lower fixing unit 430, an upper locking loop 440, a lower locking loop 450, and an auxiliary fixing portion 460.

The support bar 410 may be constituted by a plurality of bars disposed so as to be spaced apart from each other by a predetermined distance. The length of the support bar may be easily changed depending on the heights of the door 200 and the shaft 300. The sectional shape of the support bar may be circular or polygonal although the sectional shape of the support bar is not particularly restricted.

In addition, the support bar 410 may be made of aluminum, steel, or an alloy of at least two kinds of metal.

However, the material for the support bar is not limited thereto as long as it is possible to support the door 200 fixed to an upper part of the shaft 300 when the door falls.

The upper fixing unit 420 is configured to connect and fix upper ends of the plurality of support bars 410 to each other. Specifically, the upper fixing unit includes a first upper fixing piece 421, a second upper fixing piece 422, and a first turning (or pivoting) shaft 423.

It is preferable for each of the first upper fixing piece 421 and the second upper fixing piece 422 to have an approximately semicircular arc shape such that an approximately circular shape is formed when the first upper fixing piece 421 and the second upper fixing piece 422 are fastened to each other.

The first turning shaft 423 is configured to allow the first upper fixing piece 421 and the second upper fixing piece 422 to be turned or pivoted therearound in the state in which the first upper fixing piece and the second upper fixing piece are connected to each other.

Specifically, a first protrusion 421(*a*) is provided at (e.g., extending from or monolithically coupled to) one side of the first upper fixing piece 421 so as to face the second upper fixing piece 422, and a third protrusion 422(*a*) is provided at (e.g., extending from or monolithically coupled to) one side of the second upper fixing piece 422 in a direction toward the first protrusion 421(*a*) of the first upper fixing piece 421. The first turning shaft 423 is fastened to the first protrusion 421(*a*) and the third protrusion 422(*a*) so as to extend therethrough in the state in which the first protrusion 421(*a*) and the third protrusion 422(*a*) overlap vertically, whereby the first upper fixing piece 421 and the second upper fixing piece 422 are turned or pivoted.

Of course, it is obvious that each of the first protrusion 421(*a*) and the third protrusion 422(*a*) is provided with a through-hole such that the first turning shaft 423 extends through the first protrusion 421(*a*) and the third protrusion 422(*a*).

Since the first upper fixing piece 421 and the second upper fixing piece 422 are turned by a predetermined angle in a state of being fastened with each other by the first turning shaft 423, as described above, the first upper fixing piece and the second upper fixing piece may be easily attached to or detached from the shaft 300.

Meanwhile, a second protrusion 421(*b*) is provided at (e.g., extending from or monolithically coupled to) the other side of the first upper fixing piece 421 so as to face the second upper fixing piece 422, and a fourth protrusion 422(*b*) is provided at (e.g., extending from or monolithically coupled to) the other side of the second upper fixing piece 422 in a direction toward the second protrusion 421(*b*) of the first upper fixing piece 421.

The second protrusion 421(*b*) is provided with a first through-hole 421(*c*), and the fourth protrusion 422(*b*) is provided with a second through-hole 422(*c*). The first through-hole 421(*c*) and the second through-hole 422(*c*) are aligned or located on the same vertical line such that a first pin 442, a description of which will follow, extends therethrough when the second protrusion 421(*b*) and the fourth protrusion 422(*b*) overlap vertically.

The material for each of the first upper fixing piece 421 and the second upper fixing piece 422 is not particularly restricted as long as the first upper fixing piece and the second upper fixing piece are not deformed or are minimally deformed by weight of the door 200. As an example, each of the first upper fixing piece and the second upper fixing piece may be made of metal or reinforced plastic.

Next, the lower fixing unit 430 will be described. The lower fixing unit 430 is configured to connect and fix lower ends of the plurality of support bars 410 to each other. Specifically, the lower fixing unit includes a first lower fixing piece 431, a second lower fixing piece 432, and a second turning (or pivoting) shaft 433.

It is preferable for each of the first lower fixing piece 431 and the second lower fixing piece 432 to have an approximately semicircular arc shape such that an approximately circular shape is formed when the first lower fixing piece 431 and the second lower fixing piece 432 are fastened to each other.

The second turning shaft 433 is configured to allow the first lower fixing piece 431 and the second lower fixing piece 432 to be turned or pivoted therearound in the state in which the first lower fixing piece and the second lower fixing piece are connected to each other at the appropriate respective ends.

Specifically, a fifth protrusion 431(*a*) is provided at (e.g., extending from or monolithically coupled to) one side of the first lower fixing piece 431 so as to face the second lower fixing piece 432, and a seventh protrusion 432(*a*) is provided at (e.g., extending from or monolithically coupled to) one side of the second lower fixing piece 432 in a direction toward the fifth protrusion 431(*a*) of the first lower fixing piece 431. The second turning shaft 433 is fastened to the fifth protrusion 431(*a*) and the seventh protrusion 432(*a*) so as to extend therethrough in the state in which the fifth protrusion 431(*a*) and the seventh protrusion 432(*a*) overlap vertically, whereby the first lower fixing piece 431 and the second lower fixing piece 432 are turned.

Of course, it is obvious that each of the fifth protrusion 431(*a*) and the seventh protrusion 432(*a*) is provided with a through-hole such that the second turning shaft 433 may extend through the fifth protrusion 431(*a*) and the seventh protrusion 432(*a*).

Since the first lower fixing piece 431 and the second lower fixing piece 432 are turned by a predetermined angle in a state of being fastened with each other by the second turning shaft 433, as described above, the first lower fixing piece and the second lower fixing piece may be easily attached to or detached from the shaft 300.

Meanwhile, a sixth protrusion 431(*b*) is provided at (e.g., extending from or monolithically coupled to) the other side of the first lower fixing piece 431 so as to face the second lower fixing piece 432, and an eighth protrusion 432(*b*) is provided at (e.g., extending from or monolithically coupled to) the other side of the second lower fixing piece 432 in a direction toward the sixth protrusion 431(*b*) of the first lower fixing piece 431.

The sixth protrusion 431(*b*) is provided with a third through-hole 431(*c*), and the eighth protrusion 432(*b*) is provided with a fourth through-hole 432(*c*). The third through-hole 431(*c*) and the fourth through-hole 432(*c*) are aligned or located on the same vertical line such that a second pin 452, a description of which will follow, extends therethrough when the sixth protrusion 431(*b*) and the eighth protrusion 432(*b*) overlap vertically.

The material for each of the first lower fixing piece 431 and the second lower fixing piece 432 is not particularly restricted as long as the first lower fixing piece and the second lower fixing piece are not deformed or are minimally deformed by weight of the door 200. As an example, each of the first lower fixing piece and the second lower fixing piece may be made of metal or reinforced plastic.

Next, the upper locking loop 440, which is configured to fix the first upper fixing piece 421 and the second upper fixing piece 422 of the upper fixing unit 420 to each other or to release the state in which the first upper fixing piece and the second upper fixing piece are fixed to each other, will be described.

The upper locking loop 440 includes a first connection portion 441 and a first pin 442. Specifically, one side of the first connection portion 441 is connected to the support bar 410, and the other side of the first connection portion is connected to the first pin 442.

The first connection portion 441 may have a rope shape or a shape in which a plurality of annular rings is connected to each other; however, the shape of or the material for the first connection portion is not particularly restricted as long as it is possible to connect the support bar 410 and the first pin 442 to each other.

It is possible to prevent loss of the first pin 442 by the provision of the first connection portion 441 and to rapidly fix the first upper fixing piece 421 and the second upper fixing piece 422 to each other or to rapidly release the state in which the first upper fixing piece and the second upper fixing piece are fixed to each other.

The first pin 442 is mounted in the first through-hole 421(*c*) and the second through-hole 422(*c*), whereby separation between the first upper fixing piece 421 and the second upper fixing piece 422 is prevented at the ends coupled by the first pin 442.

The first pin 442 may include a pillar-shaped body portion configured to be mounted or inserted in the first through-hole 421(*c*) and the second through-hole 422(*c*) and a head portion provided at an upper part of the body portion. It is preferable for the head portion to have an outer diameter greater than the inner diameter of the first through-hole 421(*c*) or the second through-hole 422(*c*) such that the body portion of the first pin 442 remains received in the first through-hole 421(*c*) and the second through-hole 422(*c*).

Next, the lower locking loop 450, which is configured to fix the first lower fixing piece 431 and the second lower fixing piece 432 of the lower fixing unit 430 to each other or to release the state in which the first lower fixing piece and the second lower fixing piece are fixed to each other, will be described.

The lower locking loop 450 includes a second connection portion 451 and a second pin 452. Specifically, one side of the second connection portion 451 is connected to the support bar 410, and the other side of the second connection portion is connected to the second pin 452.

The second connection portion 451 may have a rope shape or a shape in which a plurality of annular rings is connected to each other; however, the shape of or the material for the second connection portion is not particularly restricted as long as it is possible to connect the support bar 410 and the second pin 452 to each other.

It is possible to prevent loss of the second pin 452 by the provision of the second connection portion 451 and to rapidly fix the first lower fixing piece 431 and the second lower fixing piece 432 to each other or to rapidly release the state in which the first lower fixing piece and the second lower fixing piece are fixed to each other.

The second pin 452 is mounted in the third through-hole 431(*c*) and the fourth through-hole 432(*c*), whereby separation between the first lower fixing piece 431 and the second lower fixing piece 432 is prevented at the ends coupled by the second pin 452.

The second pin 452 may include a pillar-shaped body portion configured to be mounted in the third through-hole 431(*c*) and the fourth through-hole 432(*c*) and a head portion provided at an upper part of the body portion. It is preferable for the head portion to have an outer diameter greater than the inner diameter of the third through-hole 431(*c*) or the fourth through-hole 432(*c*) such that the body portion of the second pin 452 remains received in the third through-hole 431(*c*) and the fourth through-hole 432(*c*).

Finally, the auxiliary fixing portion 460 is configured to connect the plurality of support bars 410 to each other and to prevent bending of the support bars 410. It is preferable for one or more auxiliary fixing portions to be provided along a longitudinal direction of the support bar 410, and it is more preferable for two or more auxiliary fixing portions to be provided along the longitudinal direction of the support bar.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Chamber
200: Door
300: Shaft
400: Door descent preventing apparatus
410: Support bar
420: Upper fixing unit
421: First upper fixing piece
421(*a*): First protrusion 421(*b*): Second protrusion
421(*c*): First through-hole
422: Second upper fixing piece
422(*a*): Third protrusion 422(*b*): Fourth protrusion
422(*c*): Second through-hole
423: First turning shaft
430: Lower fixing unit
431: First lower fixing piece
431(*a*): Fifth protrusion 431(*b*): Sixth protrusion
431(*c*): Third through-hole
432: Second lower fixing piece
432(*a*): Seventh protrusion 432(*b*): Eighth protrusion
432(*c*): Fourth through-hole
433: Second turning shaft
440: Upper locking loop
441: First connection portion 442: First pin
450: Lower locking loop
451: Second connection portion 452: Second pin
460: Auxiliary fixing portion

The invention claimed is:

1. A door descent preventing apparatus comprising:
a plurality of support bars;
an upper fixing unit configured to connect upper ends of the support bars to each other, the upper fixing unit including a first upper fixing piece having a semicircular arc shape and a second upper fixing piece having a semicircular arc shape; and
a lower fixing unit configured to connect lower ends of the support bars to each other, the lower fixing unit including a first lower fixing piece having a semicircular arc shape and a second lower fixing piece having a semicircular arc shape, wherein the first upper fixing piece is provided with a first protrusion having a first through-hole, the second upper fixing piece is provided with a second protrusion having a second through-hole, wherein the first through-hole and the second through-hole are aligned when the first protrusion and the second protrusion overlap each other, and wherein the door descent preventing apparatus further comprises an upper locking loop positioned in the first through-hole and the second through-hole.

2. The door descent preventing apparatus according to claim 1, wherein the first upper fixing piece and the second upper fixing piece of the upper fixing unit are connected to each other via a first turning shaft so as to be turnable in a state in which the first upper fixing piece and the second upper fixing piece are fastened to each other at respective ends corresponding to the first turning shaft.

3. The door descent preventing apparatus according to claim 1, wherein the upper locking loop comprises:

a first connection portion having a first side connected to the support bar; and a first pin having a first side connected to the first connection portion, the first pin being detachably coupled to the first through-hole and the second through-hole.

4. The door descent preventing apparatus according to claim 1, wherein the first lower fixing piece and the second lower fixing piece of the lower fixing unit are connected to each other via a second turning shaft so as to be turnable in a state in which the first lower fixing piece and the second lower fixing piece are fastened to each other at respective ends corresponding to the second turning shaft.

5. The door descent preventing apparatus according to claim 4, wherein the first lower fixing piece is provided with a third protrusion having a third through-hole, the second lower fixing piece is provided with an fourth protrusion having a fourth through-hole, and the third through-hole and the fourth through-hole are aligned when the third protrusion and the fourth protrusion overlap each other.

6. The door descent preventing apparatus according to claim 5, further comprising a lower locking loop positioned in the third through-hole and the fourth through-hole.

7. The door descent preventing apparatus according to claim 6, wherein the lower locking loop comprises:

a second connection portion having a first side connected to the support bar; and a second pin having a first side connected to the second connection portion, the second pin being detachably coupled to the third through-hole and the fourth through-hole.

8. The door descent preventing apparatus according to claim 1, further comprising at least one auxiliary fixing portion configured to connect the plurality of support bars to each other.

9. A door descent preventing apparatus comprising:

a plurality of support bars;

an upper fixing unit configured to connect upper ends of the support bars to each other, the upper fixing unit including a first upper fixing piece having a semicircular arc shape and a second upper fixing piece having a semicircular arc shape; and a lower fixing unit configured to connect lower ends of the support bars to each other, the lower fixing unit including a first lower fixing piece having a semicircular arc shape and a second lower fixing piece having a semicircular arc shape, wherein the first upper fixing piece is provided with a first protrusion having a first through-hole, the second upper fixing piece is configured to engage with the first upper fixing piece and is provided with a second protrusion having a second through-hole, and the first through-hole and the second through-hole are vertically aligned when the first protrusion and the second protrusion overlap each other.

* * * * *